United States Patent [19]

Ishiwatari et al.

[11] Patent Number: 5,278,610
[45] Date of Patent: Jan. 11, 1994

[54] ROTARY CAMERA HAVING DATA RECORDING DEVICE

[75] Inventors: Morio Ishiwatari; Youichi Yamato; Yoshikazu Konaya, all of Ayase; Shinichi Shidara, Tokyo, all of Japan

[73] Assignee: Fuji Photo Film Co., Ltd., Kanagawa, Japan

[21] Appl. No.: 777,210

[22] Filed: Oct. 16, 1991

[30] Foreign Application Priority Data

Oct. 16, 1990 [JP] Japan ................... 2-257301
Oct. 16, 1990 [JP] Japan ................... 2-275299
Oct. 16, 1990 [JP] Japan ................... 2-275300

[51] Int. Cl.$^5$ ................ G03B 27/32; G03B 27/52
[52] U.S. Cl. ......................... 355/64; 355/48; 355/49; 355/50; 355/51
[58] Field of Search ............. 355/64, 48, 49, 50, 355/51

[56] References Cited

U.S. PATENT DOCUMENTS

| | | |
|---|---|---|
| 3,645,619 | 2/1972 | Burton et al. ............... 355/64 |
| 4,018,525 | 4/1977 | Broderick et al. ........... 355/64 |
| 4,548,492 | 10/1985 | Kanaoka et al. ............ 355/64 |
| 4,577,956 | 3/1986 | Klosterhuber et al. ..... 355/64 |
| 4,711,566 | 12/1987 | Evans .......................... 355/64 |
| 5,049,924 | 9/1991 | Moro et al. .................. 355/50 |

Primary Examiner—Monroe H. Hayes
Attorney, Agent, or Firm—Sughrue, Mion, Zinn, Macpeak & Seas

[57] ABSTRACT

A rotary camera for photographing a plurality of original documents on microfilm and for recording information relating to the photographed original documents together with data concerning the conditions for photographing additional necessary data. The rotary camera has an exposure roller on which images of the original documents are focused to be photographed and unidimensionally arranged light emitting elements opposed to the exposure roller. The light emitting elements are selectively energized so that the microfilm is exposed to the data-writing lights forming any desired images of the data in the form of letters, numerals or marks while moving in contact with the exposure roller. The data to be recorded is designated and is put into the control system through a keyboard. A jam-mark may be recorded on the microfilm as the data in response to an output from a jamming detector. Similarly, a lamp failure mark may be recorded when a lamp failure condition is detected by a sensor sensing insufficient illuminating of the original document being photographed.

13 Claims, 9 Drawing Sheets

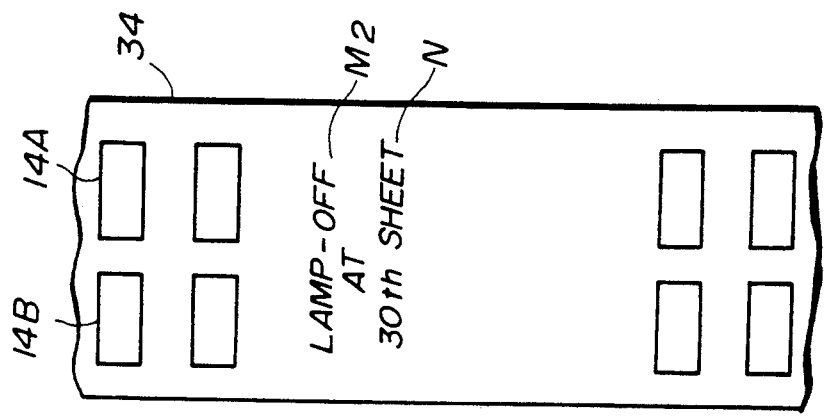
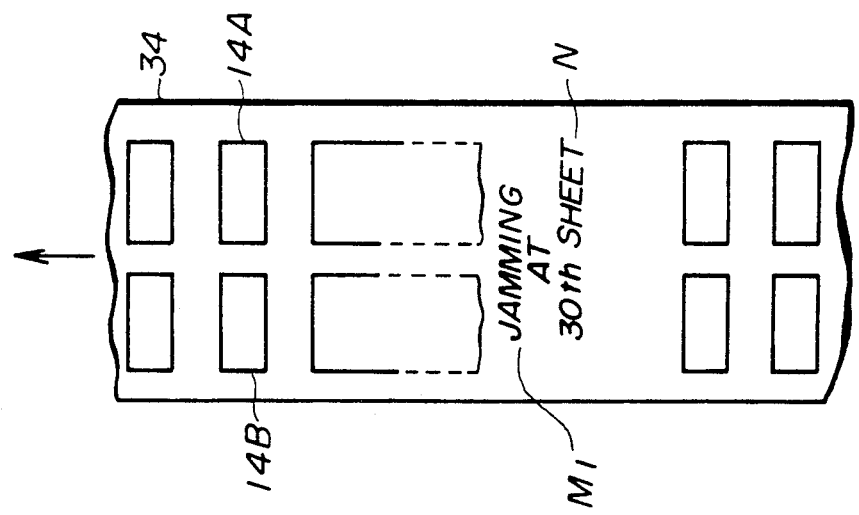

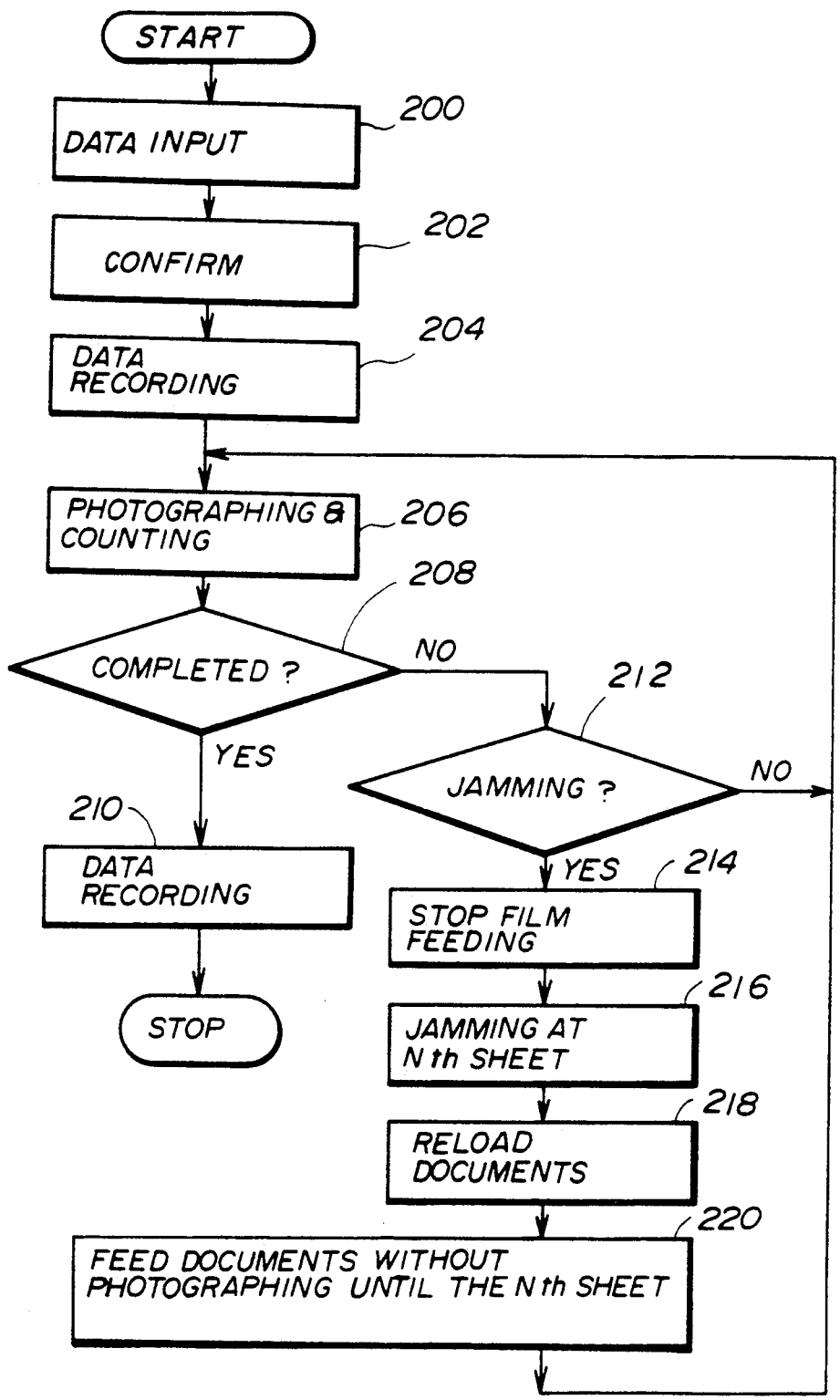

ROTARY CAMERA HAVING DATA RECORDING DEVICE

BACKGROUND OF THE INVENTION

1. Field of the Invention

The present invention relates generally to a rotary camera for photographically recording a plurality of original documents on a roll of microfilm, the microfilm is moved in. The direction reverse to the traveling direction of the original documents which are fed successively to be photographed by the rotary camera. Particularly, the invention relates to such a rotary camera having a data recording device for recording data relating to the photographed original documents and also recording an error mark if some erroneous condition is detected during the successive photographing operations. The erroneous condition automatically detected and recorded on the microfilm, according to the invention, includes jamming of the original documents and the lamp-off condition at which the light quantity illuminating the original document at the photographing position drops below a certain level. A jam mark is recorded in the former case, and a lamp-off mark is recorded in the latter case.

2. Prior Art Statement

The rotary camera has been developed and used as one type of the cameras in which microfilm is used to store photographed images. Generally in a rotary camera, the microfilm roll is intermittently moved in the direction reverse to the travelling direction of the original documents to be photographed, and the light incident on the successive original documents is reflected by the surface of each so as to pass through a slit, and is focused on the surface of the continuously moving microfilm roll so that images of the original documents are photographically recorded on the microfilm roll successively.

Together with the photographed images, it is desirable to record necessary data, such as date, time, contents or types of the original documents, and other data on the microfilm. In conventional devices, the such data has been recorded on the microfilm roll while holding the film by on a flat plate in a stationary manner and exposing the film to lights emitted from an eight-segment light emitting element. Accordingly, in order to record such data on the film, feeding of the microfilm must be stopped.

Since the microfilm roll is stopped and held while the backside of a portion of the microfilm roll is supported by a flat back-up plate, the length of the film passage route is increased and an additional space for accommodating the flat plate and eight-segment light emitting element is required. The necessity of intermittent stopping the microfilm roll also complication the driving mechanism and adds difficulty to the assembly of the total system Since a relatively large eight-segment light emitting element must be assembled in the system in opposition to the flat back-up plate, compactness of the system is hindered.

Meanwhile, although plural original documents are fed successively one after another at a constant travelling rate and at constant intervals in the normal photographing operation, jamming or other abnormal feeding of the documents often occur due to the presence of folding lines creases or other irregularities in the documents. Once jamming occurs, jammed document sheets must be rearranged in the normal condition, and photographing of the documents must be re-started from the document which is fed prior to the occurrence of the disorder causing jamming. As a result, some number of the documents fed prior to the occurrence of jamming are photographed repeatedly. However, the image in each frame on the microfilm roll is too small to identify the location of the frame at which jamming occurs or to find the repeatedly photographed images of the same document by visually observing the developed microfilm.

Accompanying the occurrence of jamming, the photographed image sequence is somehow disturbed. For example, the length of a certain frame is increased or an abnormally long blank space is left between adjacent frames. However, by only inspecting the developed film visually, it is difficult to to ascertain the true cause of such a disturbance. For instance, even if a long blank space is left at a certain location, it is difficult to judge whether the blank space indicates the termination of a normal sequential photographing operation or jamming or other malfunction.

Another malfunction which might occur during the successive photographing operation is a lamp failure condition at which the lamp illuminating the document surface is damaged, for example, by breakdown of the filament of the lamp. When the a lamp failure condition occurs, the film continues to be moved, as though normal photographing operation is continued, without being exposed to the image-bearing light. Once the camera has been in the lamp failure condition, the broken lamp must be exchanged and the photographing operation must be repeated to photograph the documents fed after the occurrence of the lamp failure condition. In such a case, some of the documents might be repeatedly photographed in the preceding and subsequent operation cycles. However, since the photographed images are too small to be inspected. Visually, it is difficult to identify the particular document which has been photographed occurrence during the lamp failure condition and to ascertain the repeatedly photographed images.

When the lamp-off condition occurs, some blank space appears on the microfilm. However, it is difficult to judge the true cause for such a blank space by only visually inspecting the developed film. For instance, even if a long blank space is left at a certain location, it is difficult to judge whether the blank space indicates the termination of normal sequential photographing operation or indicates the occurrence of the lamp failure condition.

OBJECT AND SUMMARY OF THE INVENTION

A first important object of this invention is to provide a rotary camera having a data recording device for recording auxiliary data relating to the photographed original documents and photographing operation.

A second important object of this invention is to proved a rotary camera having a data recording device for recording an error mark if some erroneous condition is detected during the successive photographing operation.

An additional object of this -invention is to provide such a rotary camera in which the data recording device comprises a small-size light emitting assembly including plural linear or unidirectionally arranged light emitting elements which are energized selectively and intermittently by a driver which in turn is controlled by a controller operated in response to the instructions supplied from an instruction system, so that various marks can be recorded on the film without stopping the feeding of the film.

A further object of this invention is to provide such a rotary camera having the data recording device serving as a multiple-function recording device, and yet being composed by a are reduced number of parts and readily assembled.

A still further object of this invention is to provide a rotary camera provided with the data recording device of the aforementioned type for recording a jam mark, which is clear and distinctive even by the visual inspection of the developed film, at a location at which jamming occurs. Repeated photographing of some documents or missing of photographing can be easily discriminated by inspecting the microfilm in an area proximate the jam mark.

Yet a further object of this invention is to provide a rotary camera provided with the data recording device of the aforementioned type for recording a lamp failure mark, which is clear and distinctive even by the visual inspection of the developed film, at a location at which the lamp is broken or the light quantity emitted from the lamp dress below a normal level. Repeated photographing of some documents or missing of photographing can be easily discriminated by inspecting the microfilm in an area proximate the lamp-off mark.

The first important object of this invention is achieved by the provision of a rotary camera for photographing a plurality of original documents successively on a microfilm roll and for recording, on the microfilm, data including information data relating to the photographed original documents and/or the photographing conditions, microfilm roll being moved in the direction reverse to the travelling direction of the original documents fed successively to be photographed by the rotary camera, comprising:

(a) an original document conveyor assembly for feeding said plural original documents to pass through a photographing position;
(b) a lamp unit for illuminating said original domuments at said photographing position;
(c) a lens system for focusing the image-bearing light reflected by the illuminated surface of said original documents;
(d) an exposure roller around which said microfilm roll passes to be exposed by said image-bearing light, said microfilm being exposed to said image-bearing light while being moved in contact with said exposure roller;
(e) a light emitting assembly facing said exposure roller for recording said data on said microfilm roll, said light emitting assembly including a plurality of light emitting elements disposed unidimensionally;
(f) an instruction system for supplying a signal for instructing to record said data on said microfilm roll; and
(g) a controller for selectively energizing said light emitting elements in response to said signal supplied from said instructing system to emit light in synchronism with the movement of said microfilm roll to record said data on said microfilm roll.

According to a principal feature of the invention, light emitting elements arranged unidimensionally are selectively energized to record data on the film. Photographing of images and recording of data are effected on the same roller, the size of the system can be decreased and the efficiency for assembling the system can be improved.

A keyboard is used as the instruction system, selected data can be put through the keyboard to be recorded on the film.

The second important object of this invention is achieved by a rotary camera wherein the jamming detector for detecting jamming of original documents is provided as an instruction system and a jam mark, as an error mark, is recorded by the data recording device when jamming of original documents occurs. Upon detection of jamming, the controller stops photographing of the original documents.

The jam detector may be a detector for monitoring the time required for passing one document and judging that jamming occurs when the time required for passing one document is prolonged. A counter may be provided to count the number of documents which have been photographed prior to the occurrence of jamming, and the thus counted number as well as the jam mark is recorded on the microfilm. The set of original documents may be reloaded and the original documents which have been fed prior to the occurrence of jamming are passed without photographing the same, redundantly and photographing is initiated when the first document which has been fed after the occurrence of jamming in the preceding operation cycle comes to the photographing position.

According to modified feature described in the preceding paragraph, the lamp failure detector for detecting the lamp failure condition is provided as an instruction system and a lamp failure mark, as an error mark, is recorded by the data recording device when the lamp failure condition occurs. Upon detection of the lamp-off condition, the controller stops photographing of the original documents.

The lamp failure detector may be a photo-sensor for sensing a light quantity illuminating the original documents, and a comparator for comparing the sensed light quantity with a standard light quantity to generate the signal for instructing the device to print the lamp failure mark when the sensed light quantity is lower than the standard light quantity. A counter may be provided to count the number of documents which have been photographed prior to the occurrence of the lamp failure condition, and the thus counted number is recorded on the microfilm together with the lamp failure mark. The set of original documents may be reloaded and the original documents which have been fed prior to the occurrence of the lamp failure condition are passed without photographing the same, redundantly and photographing is initiated when the first document which has been fed after the occurrence of lamp-off condition in the preceding operation cycle comes to the photographing position.

BRIEF DESCRIPTION OF THE DRAWINGS

FIG. 8 is a view showing an example of the jam mark and the counted number recorded on the microfilm roll by the use of an embodiment of the invention;

FIG. 9 is a diagram showing the operation sequence for recording the data relating to the original documents and for recording the jam mark when jamming of the original document occurs;

FIG. 10 is a view exemplarily showing the lamp failure mark and the counted number recorded on the microfilm roll by the use of an embodiment of the invention;

DETAILED DESCRIPTION OF PREFERRED EMBODIMENTS

Figure 2:
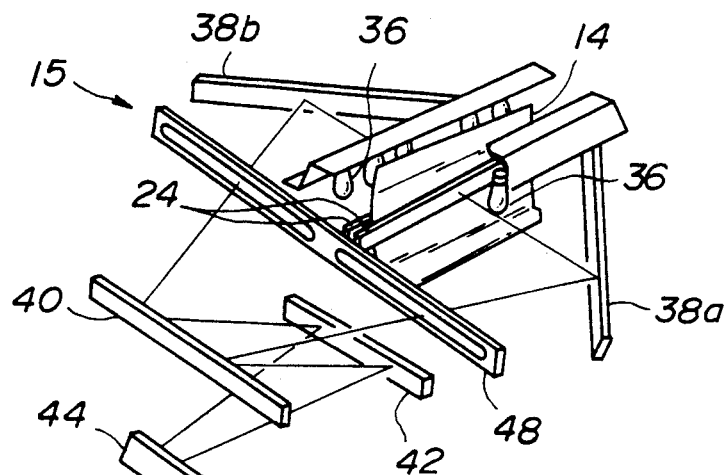
FIG. 2 is a perspective view showing the optical system of the embodiment of FIG. 1.
Figure 3:
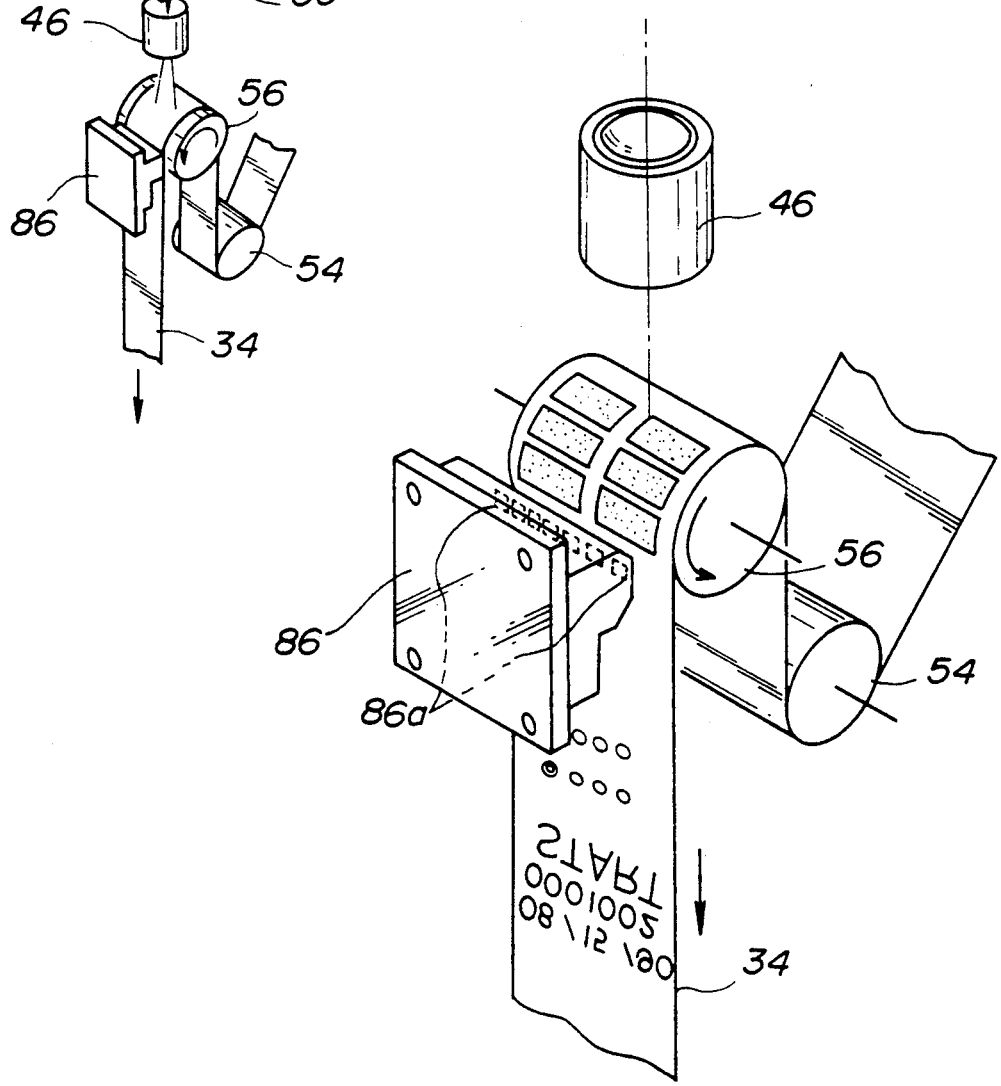
FIG. 3 is an enlarged view showing a portion of the optical system.
Figure 4:
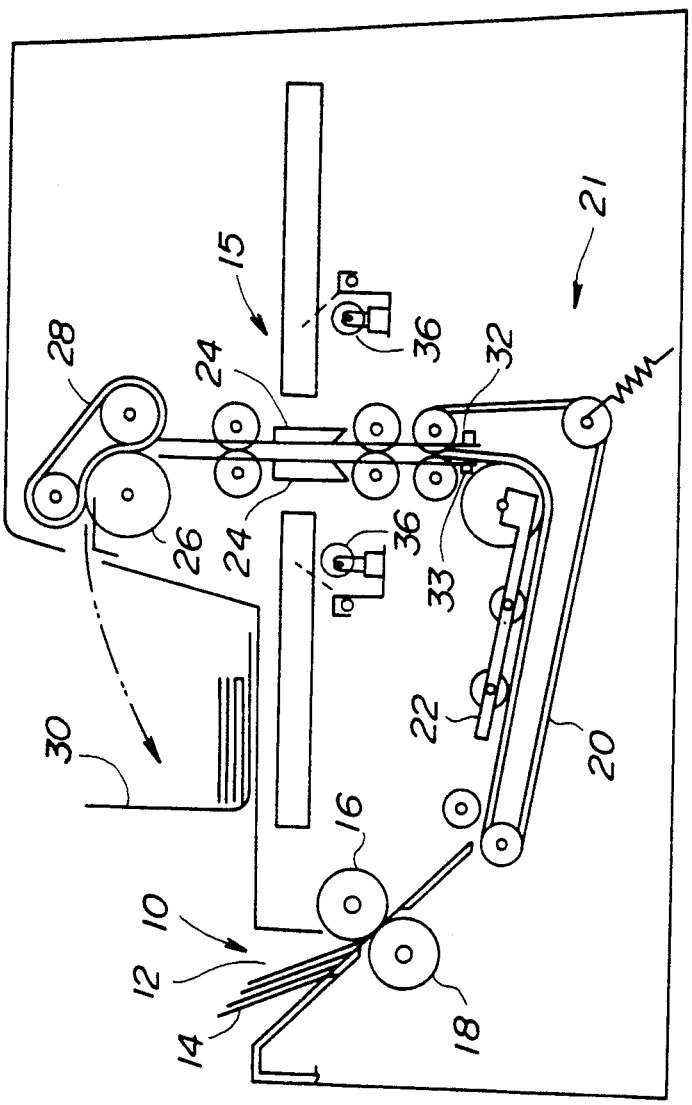
FIG. 4 is an elevational view showing the original document conveyer assembly.

Initially referring to FIGS. 2 and 4, the original document conveyer assembly 21 is described.

In FIG. 4, an auto-feeder 10 has a document loading port 12 in which a group of original documents 14 (for example, bank and commercial bills or like) is loaded in a stacked condition. A feeding roller 16 contacts with the leading end of the uppermost document sheet 14 and rotates in the direction of feeding the uppermost document sheet 14, and a holding roller 18 is in contact with the downside of the uppermost document sheet 14 and rotates in the direction reverse to the rotating direction of the feeding roller 16. Thus, the document sheets 14 are fed one after another through the rollers 16 and 18 to a photographing position 15. An endless conveyer belt 20 runs along a passage defined by an appropriate number of drive rollers so that the document sheets 14 travel successively one by one. A roller unit 22 contacts with the surface of the conveyer belt 20 under pressure, and the documents sheets 14 fed from the auto feeder 10 are conveyed while being held between the surface of the conveyer belt 20 and the roller unit 22. The travelling direction of the document sheets 14 is turned upwards, so that the document sheets 14 travel in the upward direction to pass through a slit between opposing glass plates 24, 24 while being grasped by conveying roller pairs. The leading end of each of the document sheets 14 is then pinched by a discharge roller 26 and a belt 28, so that each document sheet 14 is discharged to a stacker 30. In the illustrated embodiment, the original document conveyer assembly 21 comprises the feeding and holding rollers 16, 18, the conveyer belt 20, the roller unit 22, the discharge roller 26 and the belt 28. The photographed document sheets 14 are discharged to the stacker 30 to be stored therein in the same order as they are supplied. The obverse side and the reverse side of each document sheet 14 are photographed as the sheets 14 passes through the photographing position 15 while travelling at a constant rate through the slit formed by the opposing glass plates 24, 24. The leading and trailing ends of each document sheet 14 are sensed by a document detection sensor 32. A light emitting element 33, such as an LED (light emitting diode), is disposed in opposition to the sensor 32 so that a light emitted from the LED 33 is received by the sensor 32. When each of the document sheets 14 pass through the gap between the LED 33 and the sensor 32, the light from the LED 33 to the sensor 32 is shielded, whereby passage of the document sheets 14 are sensed.

As described above, both of the obverse and reverse sides of each document sheet 14 are photographed simultaneously as the document sheet 14 passes through the slit defined by the glass plates 24, 24, so that images of the obverse and reverse sides of each document sheet 14 are reproduced on a microfilm 34 to form two images placed in parallel relationship with each other. The photographing system used in this embodiment is a so-called duplex type system. In detail, as shown in FIG. 2, both sides of each document sheet 14 are illuminated by two lamp units 36, 36, one for illuminating the obverse side and the other for illuminating the reverse side, which are oppositely disposed outside of the glass plates 24, 24. Each lamp unit 36 comprises a plurality of lamps. The image-bearing lights reflected respectively by the obverse and reverse sides of the document sheet 14 are reflected by mirrors 38a and 38b, and then reflected by mirrors 40, 42 and 44 to be guided to a lens system 46. The images are focused by the lens system 46 on the surface of the microfilm 34. Each of the images focused on the microfilm 34 is a slit-form image extending in the direction perpendicular to the travelling direction of the document sheet 14, since the image-bearing lights pass through slits 48. A shutter 50 is disposed above the lens system 46 for closing or opening the light path to the lens system 46.

Figure 5:
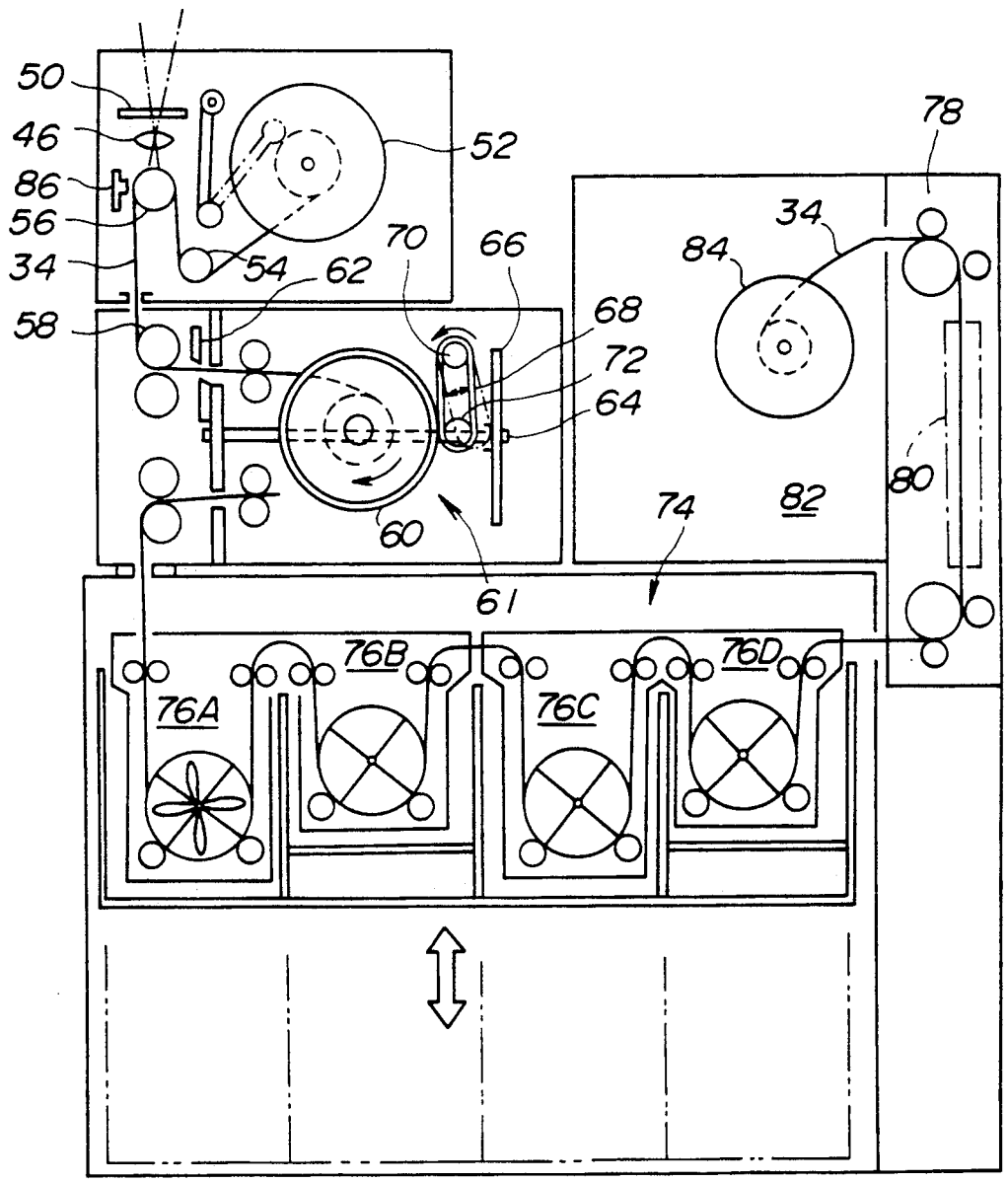
FIG. 5 is a view showing schematically the passage through which the microfilm roll is moved.

The route for passage of the microfilm 34, which passes through a position below the lens system 46, will now be described by referring to FIG. 5. In FIG. 5, reference numeral 52 designates a feed spool for feeding the microfilm roll 34 which is passed through a guide roller 54, an exposure roller 56 and a guide roller 58 to be taken up around a take-up spool assembly 61. A cutter 62 is disposed at a position upstream of the take-up spool assembly 61, and operated by pushing a development initiation key 108 which will be described in detail hereinafter. The exposure roller 56 is disposed at a position higher than the guide rollers 54 and 58, and the microfilm 34 runs over the exposure roller 56 so that the backside thereof contacting closely on the upper half of the circumference of roller 56. Meantime, the lens system 46 is disposed above the exposure roller 56 to focus images on the surface of the microfilm 34, the images being decreased in size by the lens system 46. The guide roller 58 is driven by a not-shown motor to rotate at a constant rate to keep the film feeding rate constant.

The take-up spool assembly 61 includes a pair of spools 60 which are held at both sides of a horizontal rotation shaft 64 (only one spool 60 is shown in the FIG.5). A circular disk 66 is fixedly attached to the right end of the rotation shaft 64 (as viewed in FIG. 5). A drive belt 68 is disposed between the circular disk 66 and the spool 60. The drive belt 68 runs along a pass expanded between a drive roller 70 and a follower roller 72 in the counter-clockwise direction (the direction shown by the upper arrow) as viewed in FIG. 5. As the follower roller 72 is shifted by an electromagnetic solenoid (not-shown) to a position close to the spool 60, the belt 68 contacts with the periphery of the spool 60 so that the spool 60 is rotated in the clockwise direction (the direction shown by the arrow attached to the spool 60) as viewed in FIG. 5. Under this condition, a portion of the microfilm roll 34 exposed to light is taken up, and after the completion of one successive photographing operation cycle, the development initiation key 108 is pushed to cut the exposed portion of the microfilm roll 34 with the cutter 62. As the follower roller 72 is moved close to the circular disk 66 to allow the belt 68 to contact with the circular disk 66, the rotation shaft 64 is rotated by 180 degrees together with the rotation of the circular disk 66. As a result, the positions of the paired spools 60 are exchanged with each other. Then, the follower roller 72 is shifted again to the position for contacting with the spool 60, the spool 60 is rotated in the clockwise direction. The portion of the exposed microfilm taken up around the spool is thus rolled out from the spool 60 to be passed to a developing station 74.

The developing station 74 is disposed below the spool assembly 60, and comprises a developing tank 76A, a fixing tank 76B and rinsing tanks 76C, 76D for rinsing the developed and fixed microfilm strip 34 with water. The portion of the exposed microfilm 34 rolled from the spool 60 passes through the tanks 76A to 76D to be processed therein and then passed to a drying room 78. The tanks 76A to 76D are assembled together to form an integral tank block which may be moved in the vertical direction. The processing liquids may be exchanged by lowering the tank block while leaving the members defining the development passage for the exposed microfilm 34 in place.

The rinsed strip of the microfilm 34 is heated to be dried by a heater 80 in the drying room 78, and the dried film 34 is discharged to a film tray 82. A take-up reel 84 may be provided in the film tray 82 so that the processed film 34 is taken up around the reel 84.

Reference numeral 86 designates a linear LED serving as the unidimensional light emitting assembly which comprises plural small light-emitting elements (light emitting diodes in this embodiment) 86a arranged along a line. The linear LED 86 is disposed at one side of the exposure roller 56 to face a portion of the microfilm 34 closely contacting the periphery of the exposure roller 54, namely at a portion contacting with the upper half circumference of the exposure roller 54, so that linear lighting spots (i.e. plural lighting spots arranged unidimensionally) are thrown onto the surface of the microfilm 34. A linear distribution of dots are formed by these lighting spots along the widthwise direction of the moving microfilm 34.

Figure 1:
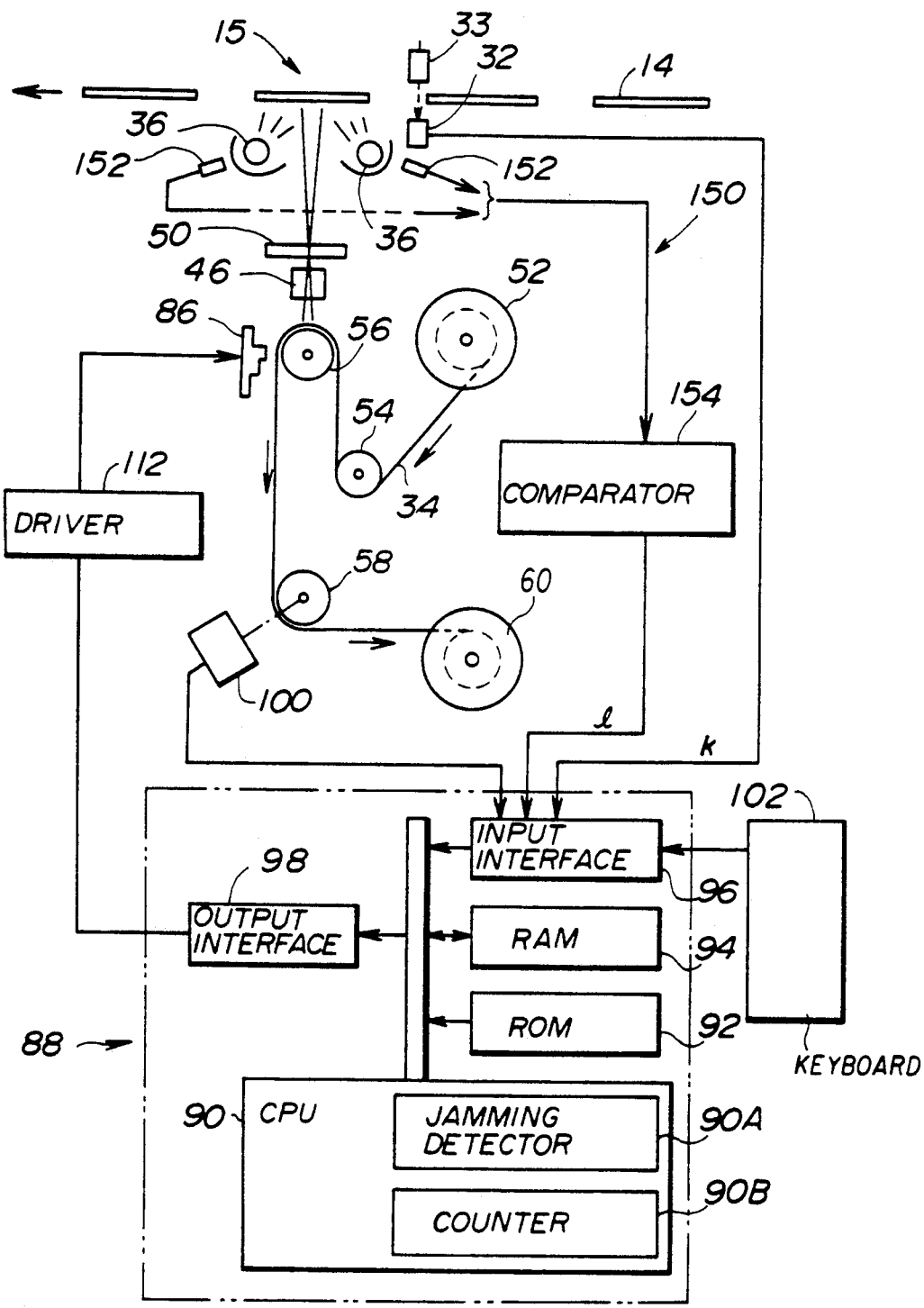
FIG. 1 is a diagrammatical illustration showing an embodiment of the invention.

Each of the small LEDS 86a respectively emitting lighting spots is controlled independently by a controller 88 (see FIG. 1) to be lighted selectively in synchronism with the moving rate of the microfilm 34 so that desired data (for example, marks, letters or numerals) are drawn by these dots. As shown in FIG. 1, the controller 88 comprises CPU 90, ROM 92, RAM 94, an input interface 96 and an output interface 98. The feeding rate of the microfilm 34 is detected by an encoder 100 mounted to the guide roller 58, and the output from the encoder 100 is fed through the input interface 96 to the CPU 90 and stored in the RAM 94 as desired. The data recorded on the microfilm 34 are instructed through an instruction system, which may include a keyboard 102, a jamming detector 90A, a counter 90B for counting the number of photographed original documents, and a lamp failure detector 150. Details of these members included in the instruction system will be described hereinafter.

Figure 6:
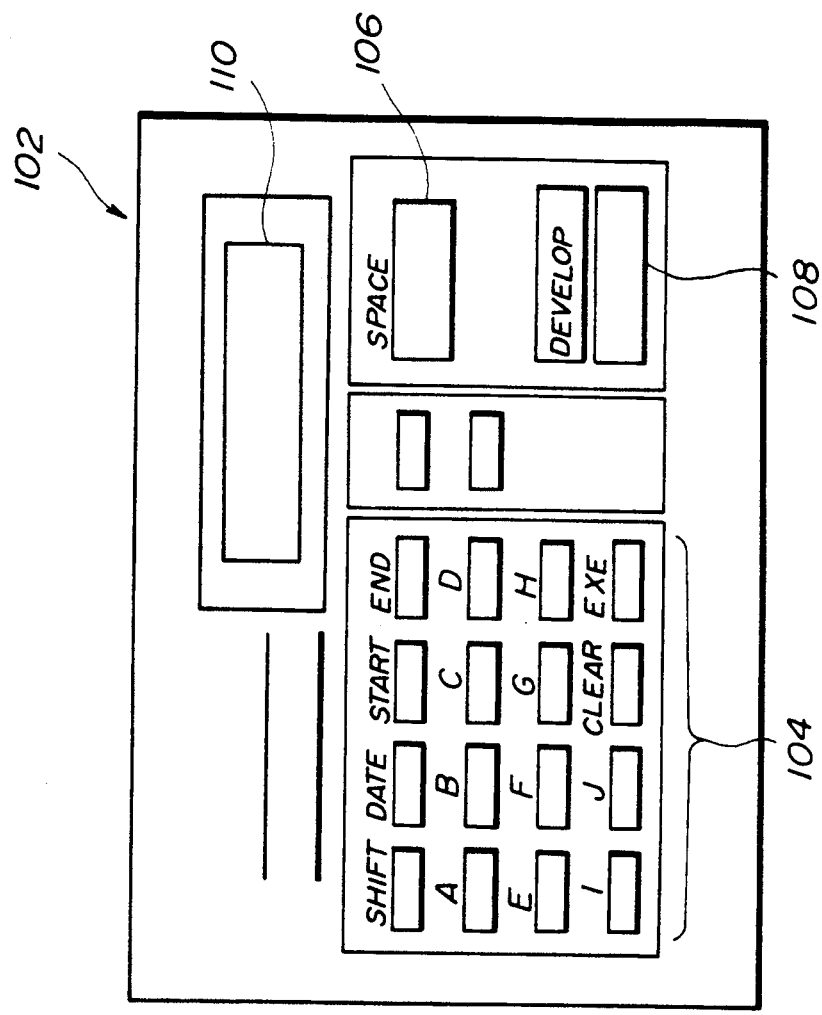
FIG. 6 is a illustration showing one example of the keyboard used in an embodiment of the invention.

As shown in FIG. 6, the keyboard 102 may have a group of data input keys 104, a space key 106 and a development initiation key 108. A liquid crystal display panel 110 is provided to display messages showing the instructed data or the operation conditions.

The CPU 90 supplies signals for energizing or lighted the selected light emitting elements 86a, which form individual picture elements after the completion of exposing, developing and fixing operations, according to the operation program stored in the ROM 92, and the signal supplied from the CPU 90 is output through the output interface 98. In response to the output signals fed through the output interface 98, respective diodes emit light selectively under the control by the driver 112 which includes an energizing circuit so that desired data are recorded on a pre-set position of the microfilm 34.

Figure 7:
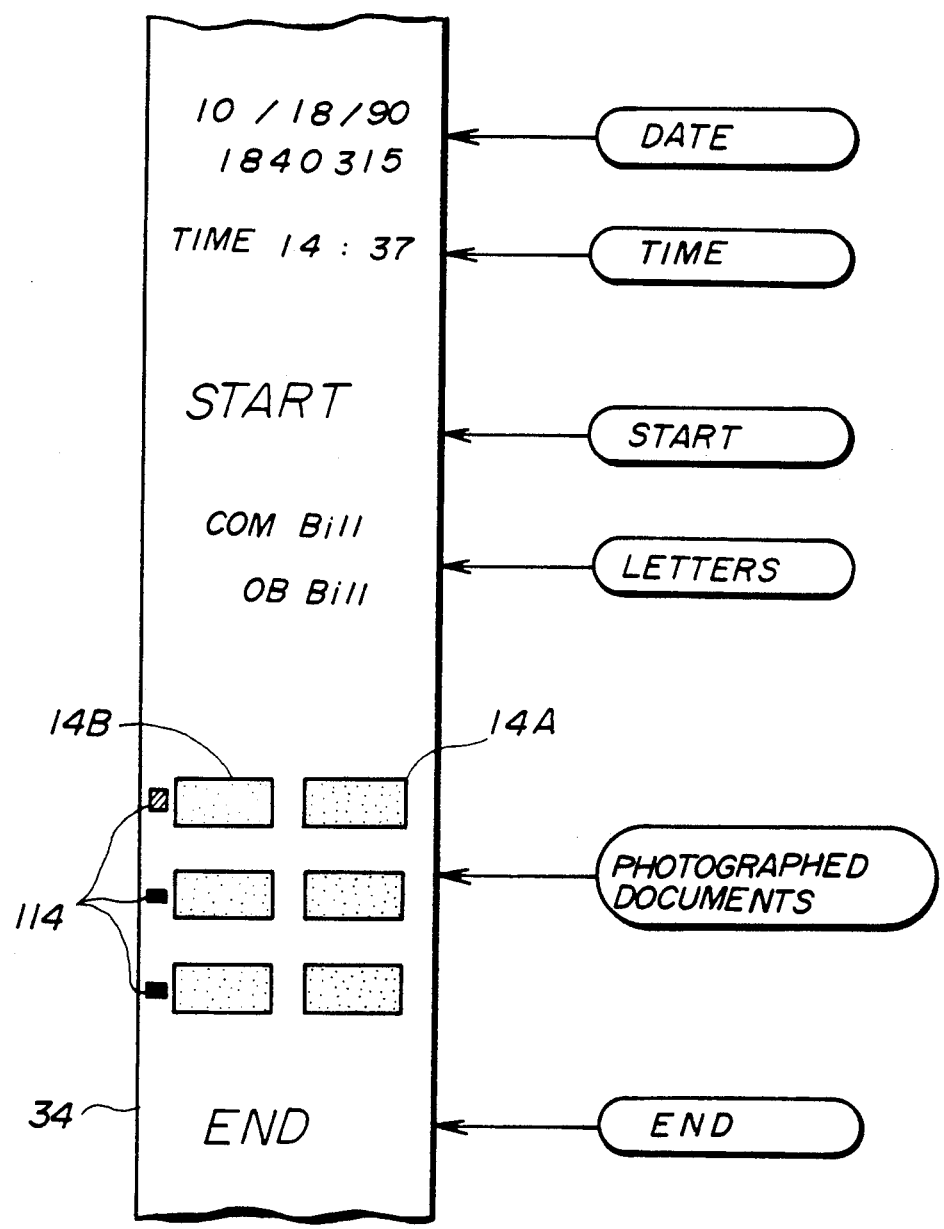
FIG. 7 is a view showing an example of the data recorded on the microfilm roll by the use of an embodiment of the invention.

One example of a data set to be recorded on the microfilm 34 is shown in FIG. 7, which includes data showing the leading and/or trailing ends of each individual photographing operation run. The photographed date may be recorded by initially pushing the "date" key in the data input keys 104, and the bank code, branch code or other necessary data may be recorded by initially pushing a proper key in the data input keys 104, for example, when the original documents are bank bills. By pushing the "date" key simultaneously with the "shift" key, the time of performing the photographing operation may be recorded. By pushing the "start" key, a large size letters "START" may be recorded on a substantially center zone of the microfilm strip 34. Depending on the kind of the photographed original documents, either one of the keys "A" to "J" may be pushed together with the "shift" key, a letter or letters showing "COM Bill" (abbreviation of commercial bill), "OB Bill" (abbreviation of bank bills of other banks), etc. may be recorded. After putting all necessary instructions through the keyboard 102 into the input interface 96, the "EXE (execute)" key in the data input keys 104 is pushed to initiate the recording operation. When photographing of all original documents 14 to be photographed by the particular operation cycle has been completed, the "end" key is pushed and then the "EXE" key is pushed to instruct the recording of the end of one cycle operation, the letter or letters showing the end of the operation cycle is recorded. The data may be in the from of blip marks 114 positioned in the marginal areas outside of the images 14A, 14B of the obverse and reverse sides of the documents 14.

The data may be stored in the ROM 92, or data input through the keyboard 102 may be temporarily stored in the RAM 94 and then recording of the data is instructed through the keyboard 102 at the time for printing the data on the microfilm 34.

The "space" key 106 is a key for feeding the microfilm roll 34 to leave a blank portion on which no image is photographed. The "development initiation" key 108 is a key which is pushed after the completion of one photographing operation cycle to cut the exposed portion of the microfilm 34 and to initiate development of the cut-off portion.

Recording of the jam mark will now be described. When jamming of the original documents 14 occurs at any position through the conveying passage therefor, the output from the document detection sensor 32 is kept unchanged. The CPU 90 in FIG. 1 serves also as the jamming detector 90A which monitors the change in output signal k generated from the sensor 32 with respect to the lapse of time and judges that jamming occurs when a time interval between successive output signals k from the sensor 32 is greater than a predetermined time interval, whereupon a signal instructing the recording of a jam mark is generated from the CPU 90. The CPU 90 further serves as the counter 90B for counting the changes in output signals from the sensor 32 to recognize the number of already photographed documents 14.

When the jamming detector 90A detects occurrence of jamming and when a signal instructing a jam mark to be recorded is generated, the controller 88 energizes the driver 112 to record a jam mark $M_1$ and a numeral N indicating the number of photographed documents prior to the occurrence of jamming on the microfilm 34 as the data to be recorded for indicating the occurrence of erroneous operation (see FIG. 8). It is preferable that the jam mark is composed of large letters which can be read with the naked eyes, but may be a blip mark 114 which is recorded in a marginal area outside of the images 14A, 14B of the photographed documents 14 similar to the blip marks 114 described with reference to FIG. 7.

The recording of the lamp failure mark will be described below.

The lamp failure condition is detected by a lamp-off detector 150 (see FIG. 1). The detector 150 comprises plural photo-sensors 152, 152 for separately sensing the lights emitted respectively from the lamp units 36, 36, and a comparator 154 for generating a lamp-off signal 1 when the light quantity emitted from either one of the lamp units 36, 36 is less than to a predetermined level. Accordingly, when either one of the lamp units 36, 36 reaches the lamp failure condition, the output from the corresponding sensor 152 is lowered to a low level, so that a signal 1 for recording the lamp failure condition is fed to the controller 88.

Upon receival of the signal 1 indicating the lamp failure condition from the lamp failure detector 150, the controller 88 energizes the driver 112 to record a lamp failure mark $M_2$ and the numeral N indicating the number of photographed documents 34 prior to the occurrence of lamp-off condition on the microfilm 34 as the data to be recorded for indicating the occurrence of erroneous operation (see FIG. 10). It is preferable that the lamp failure mark $M_2$ is composed of large letters which can be read by the naked eye, but may be a blip mark 114 which is recorded in a marginal area outside of the images 14A, 14B of the photographed documents 14 similar to the blip marks 114 described with reference to FIG. 7.

Figure 11:
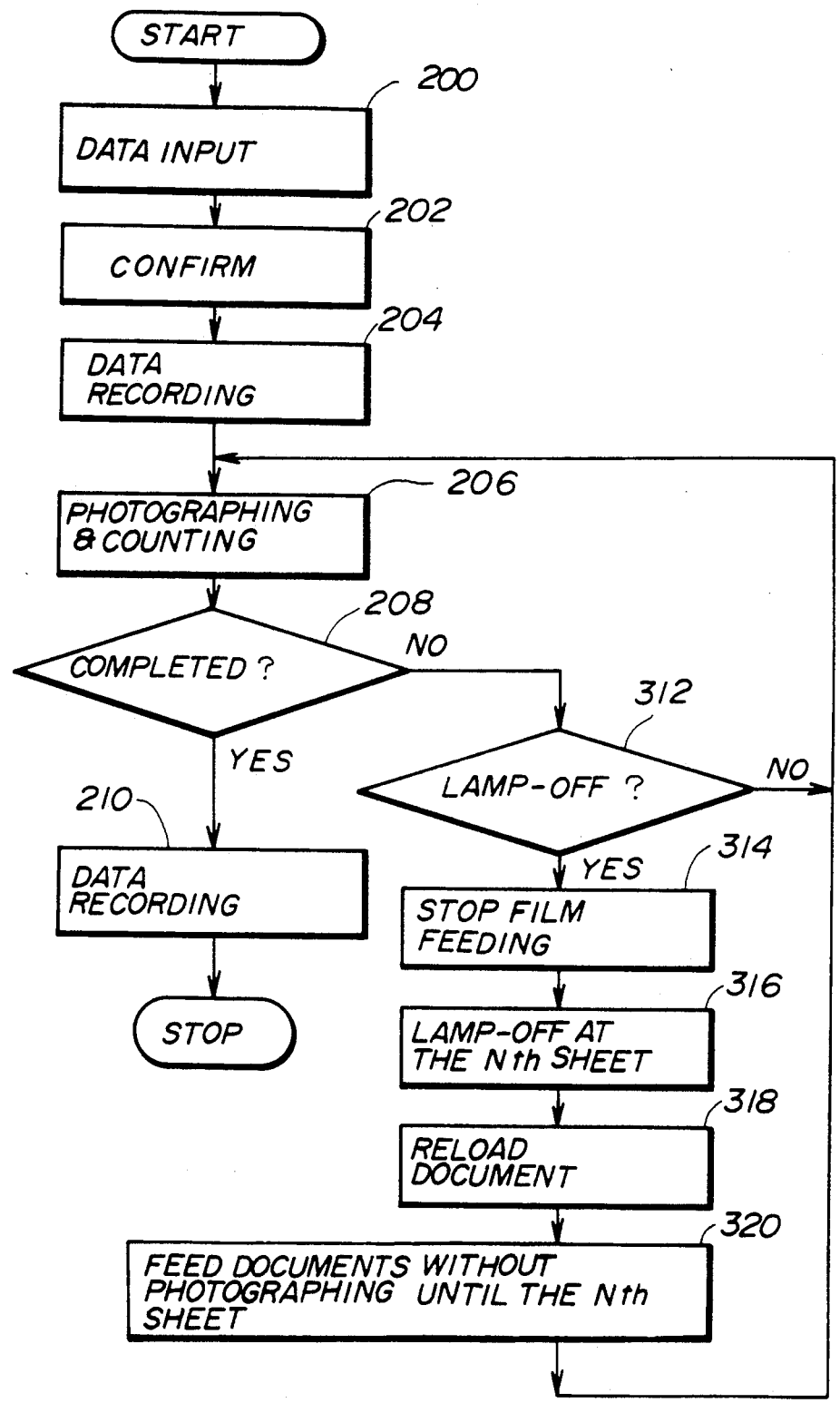
FIG. 11 is a diagram showing the operation sequence for recording the data relating to the original documents and for recording the lamp failure mark when the lamp failure condition is detected.

The operation of the embodiment will now be described by referring to FIGS. 9 and 11. Prior to initiation of photographing the original documents 14, a necessary data set will be recorded at the top or other desired position on the microfilm 34. In order to record such a data set, data to be recorded input through the keyboard 102 while the microfilm 34 is stationary (Step 200 in FIG. 9), and the "EXE" key is pushed after confirming the data by observing the display panel 110 (Step 202). Whereupon, feeding of the microfilm 34 is initiated, and small diodes 86a of the linear LED assembly 86 are lighted selectively (Step 204).

After the desired data set indicated by letters, numerals or marks has been recorded, the original documents 14 are loaded in the auto feeder 10 in a stacked condition, whereby the documents 14 are successively fed one by one from the uppermost sheet and the leading ends of respective documents 14 are sensed by the document sensor 32. After the lapse of a predetermined time from the time at which the leading end of the first document is sensed, the shutter 50 is opened to photograph both the obverse and reverse sides of the document 14 simultaneously to reproduce the images 14A, 14B. After the lapse of a predetermined time from the time at which the trailing end of the first document is sensed, the shutter 50 is closed. The aforementioned operation sequence is repeated for the next document, and similar operation sequences are repeated until the last document has been photographed. The exposed portion of the microfilm 34 is taken up around the spool 60 (Step 206). After the completion of photographing all the loaded documents 14 (Step 208). the "end" key is pushed and then the "EXE" key is pushed to record a large size letter "END" (Step 210; see FIG. 7 in combination).

Referring again to FIG. 9, if the jamming detector 90A detects the occurrence of jamming of any of the documents 14 during the successive photographing operation run (Step 212), the controller 88 stops feeding of the microfilm roll 34 (Step 214). Thereafter, the controller 88 re-starts feeding of the microfilm 34 without performing photographing operation and simultaneously energizing the light emitting elements 86a of the assembly 86 selectively to record the jam mark $M_1$ and the number N indicating the number of normally photographed documents prior to the occurrence of jamming (Step 216, see FIG. 8), and then feeding of the microfilm roll 34 is stopped. As the operator reloads the stack of the original documents 14, which is accumulated one after another in the same order as they are supplied, into the autofeeder 10 (Step 218), the controller 88 feeds the document 14 (the nth document) fed just prior to the occurrence of jamming without photographing the same, and then photographing of the documents is once again initiated from the (n+1)th document (Step 220).

On the other hand, when the lamp failure detector 150 detects the lamp-off condition (Step 312, see FIG. 11), the controller 88 stops feeding of the microfilm roll 34 (Step 314). Thereafter, the controller 88 re-starts feeding of the microfilm roll 34 without performing photographing operation and simultaneously energizing the light emitting elements 86a of the assembly 86 selectively to record the lamp-off mark $M_2$ and the number N indicating the number of normally photographed documents prior to the occurrence of lamp-off condition (Step 316), and then feeding of the microfilm roll 34 is stopped. As the operator reloads the stack of the original documents 14 into the auto-feeder 10 in the same order as they are supplied (Step 318), the controller 88 feeds the document 14 (the nth document) fed just prior to the occurrence of lamp failure condition without photographing the same, and then photographing of the documents is once again initiated from the (n+1)th document (Step 320).

After the completion of one successive photographing operation run, the "development initiation" key 108 is pushed to cut the microfilm roll 34 by the cutter 62. As the cut end of the microfilm roll 34 is taken up into the spool 60, the follower roller 72, around which the belt 68 runs, is moved to contact with the circular disk 66 so that the circular disk 66 is rotated by 180 degrees by the action of the belt 68, whereby the positions of the spools 60 are interchanged with each other. Thereafter, the follower roller 72 is returned back to the position contacting the spool 60 to rotate the spool 60 in the direction to feed the strip of the exposed microfilm 34 to the developing station 74. The developed and fixed microfilm 34 is dried in the drying room 78 and discharged to the tray 82.

As will be appreciated from the foregoing, images of original documents are focused on the surface of a portion of the microfilm contacting with an exposure roller and a light emitting assembly composed of plural light emitting elements arranged unidimensionally is faced to the same exposure roller so that the microfilm is exposed to the lighted spots emitted selectively from the plural light emitting elements to record necessary data on a desired position of the microfilm. Accordingly, a flat back-up plate for holding the microfilm during the data recording operation, otherwise necessitated in the conventional rotary camera, is not necessary. The passage for the microfilm roll is thus decreased to reduce the size of the rotary camera. Exclusion of the back-up plate contributes to a reduction in the number of the related members and simplify the assembly operation of the camera.

The linear light emitting assembly is not limited to the linear LED 86 used in the illustrated embodiment, a linear liquid crystal shutter assembly comprising a plurality of very small liquid crystal shutters arranged unidimensionally between a light source and the microfilm 34 may also be used in place of the linear LED assembly.

According to another advantage of the invention, jamming of the original documents is automatically detected and a clear and distinctive jam mark indicating the occurrence of jamming is recorded on a proper position of the microfilm. The particular location on the microfilm at which jamming occurs can be easily found by inspecting the developed film visually, and it becomes possible to judge that the particular erroneous operation is caused by the occurrence of jamming. It is preferred that the jamming detector detects jamming by monitoring the time interval between the times at which adjacent documents are sensed, since the construction of the jamming detector becomes simple and additionally the number of documents photographed prior to the occurrence of jamming can also be counted by the use of the same signals indicating passage of photographed documents.

The operation can be simplified by counting and memorizing the number of documents photographed prior to the occurrence of jamming and reloading the stack of the documents so that the normally photographed documents are fed without photographing the same and photographing of the documents is initiated from the document just processed at the occurrence of jamming or from the document fed just before the occurrence of jamming.

According to a further advantageous feature of the invention, the lamp failure condition is automatically detected and a clear and distinctive lamp failure mark indicating the occurrence of lamp failure condition is recorded on a proper position of the microfilm. The particular location on the microfilm at which lamp failure condition occurs can be easily found by inspecting the developed microfilm visually, and it becomes possible to judge that the particular erroneous operation is caused by the occurrence of lamp failure condition.

In order to simplify the construction, the lamp failure condition detector comprises a photo-sensor which detects the lamp failure condition by measuring the light quantity of the document illuminating lamp.

By recording the number of documents photographed under the normal condition prior to the occurrence of lamp failure condition together with the lamp-off mark, the unphotographed documents can be readily discriminated from the photographed documents.

The operation can be simplified by counting and memorizing the number of documents photographed prior to the occurrence of lamp failure condition and reloading the stack of the documents so that the normally photographed documents are fed without photographing the same and photographing of the documents is initiated from the document just processed at the occurrence of lamp failure condition or from the document fed just before the occurrence of lamp-off condition.

When multiple lamps 36 are installed, it is desirous that corresponding number of photo-sensors 152 are provided to sense the light quantity from each lamp 36 individually. However, the number of photo-sensors 152 may be decreased by connecting a plurality of lamps 36 in series, and all of the lamps thus connected with each other in series are turned off, when any one of these lamps 36 broken down.

In the embodiments described above, the data recorded on the film has been described as including data concerning the photographing condition such as "date", "time" or "name of operator", data relating to the photographed documents such as "kind of documents", a "jam mark" recorded in response to the signal fed from the jamming detector and a lamp failure mark recorded in response to the signal fed from the lamp failure condition detector. However, data which can be recorded on the film by the use of the rotary camera of this invention is not limited to the data referred to in the foregoing description, and various other data may be recorded in place of or in addition to the aforementioned data. Other data which can be recorded on the microfilm includes, for example, the total number of the photographed documents on a particular microfilm strip, inspection codes (e.g. bar codes) for inspecting or searching through successively photographed documents, and data indicating the relation with the documents photographed in another roll of film or film strip, for example, a data code indicating the film roll number containing the photographed images of the documents which should be contained in the same group and yet have not been contained in one film roll because of the shortage of the length of the film roll.

What is claimed is:

1. A rotary camera for photographing a plurality of original documents successively on a roll of microfilm and for recording, on said microfilm, data including information data relating to at least one of the photographed original documents and the photographing conditions, said microfilm being moved in the direction reverse to a traveling direction of said original documents which are fed successively to be photographed by said rotary camera, comprising:

(a) an original document conveyor assembly for feeding said original documents so as to pass through a photographing position;

(b) a lamp unit for illuminating said original documents at said photographing position;

(c) a lens system for focusing the image-bearing light reflected by the illuminated surface of said original documents;

(d) an exposure roller around which said microfilm passes to be exposed to said image-bearing light, said microfilm being exposed to said image-bearing light while being moved in contact with said exposure roller;

(e) a light emitting assembly in opposition to said exposure roller for recording said data on said microfilm roll, said light emitting assembly including a plurality of light emitting elements disposed uni-dimensionally;

(f) an instructing system for supplying a signal for instructing the recording of said data on said microfilm; and (g) a controller for selectively energizing said light emitting elements in response to said signal supplied from said instructing system to emit light in synchronism with the movement of said microfilm to record said data on said microfilm.

2. The rotary camera according to claim 1, wherein said instruction system includes a keyboard from which said information data relating to the photographed original documents and the photographing conditions are input.

3. A rotary camera for photographing a plurality of original documents successively on a roll of microfilm for recording on said microfilm an error mark if an error condition is detected during the successive photographing operations, said microfilm roll being moved in a direction reverse to a traveling direction of said original documents which are fed successively to be photographed by said rotary camera, comprising:

(a) an original document conveyor assembly for feeding said original documents so as to pass through a photographing position;

(b) a lamp unit for illuminating said original documents at said photographing position;

(c) a lens system for focusing the image-bearing light reflected by the illuminated surface of said original documents;

(d) an exposure roller around which said microfilm passes to be exposed to said image-bearing light, said microfilm being exposed to said image-bearing light while being moved in contact with said exposure roller;

(e) a light emitting assembly in opposition to said exposure roller for recording said error mark on said microfilm, said light emitting assembly including a plurality of light emitting elements disposed uni-dimensionally;

(f) an instruction system for supplying a signal for instructing the recording of said error mark on said microfilm; and (g) a controller for selectively energizing said light emitting elements in response to said signal supplied from said instructing system to emit light in synchronism with the movement of said microfilm to record said error mark on said microfilm.

4. The rotary camera according to claim 3, wherein said error mark is a jam mark and said instruction system includes a jamming detector for detecting jamming of said original documents to supply a signal for instructing to record said jam mark, and wherein said controller energizes said light emitting elements selectively in response to said signal supplied from said instruction system to record said jam mark on said microfilm and then said controller controls said rotary camera to stop photographing of the original documents after said error condition is detected.

5. The rotary camera according to claim 4, further comprising a sensor for sensing feeding of said original documents to said photographing position to generate output signals when respective original documents are fed to said photographing position, said jamming detector recording said output signals from said sensor to detect jamming of said original documents when the time interval between the successive output signals from said sensor is greater than a predetermined time.

6. The rotary camera of claim 4 or 5, further comprising a counter for counting the number of original documents photographed before the occurrence of jamming, said controller energizes said light emitting elements selectively to record the number of already photographed original documents together with said jam mark.

7. The rotary camera according to claim 3, wherein said error mark is a lamp failure mark and said instruction system includes a lamp failure detector for detecting an insufficiently illuminated condition of said original documents to supply a signal for instructing a lamp failure mark to be recorded, and wherein said controller energizes said light emitting elements selectively in response to said signal supplied from said instructor to record said lamp failure mark on said microfilm roll and then said controller controls said rotary camera to stop photographing said original documents after said insufficiently illuminated conditions is detected.

8. The rotary camera according to claim 7 wherein said lamp failure detector comprises a photo-sensor for sensing a light quantity illuminating said original documents, and a comparator for comparing the sensed light quantity with a standard light quantity to generate said signal for instructing said lamp failure mark to be recorded when the sensed light quantity is lower than said standard light quantity.

9. The rotary camera according to claim 7 further comprising a counter for counting the number of original documents photographed before the occurrence of said insufficiently illuminated condition, said controller energizing said light emitting elements selectively to record the number of already photographed original documents together with said lamp failure mark.

10. A method of photographing a plurality of original documents wherein said original documents are reloaded on a rotary camera after jamming occurs in photographing operation run, in the order that said original documents were originally loaded in the run during which jamming occurred, said microfilm being moved to pass through an exposure position without photographing the original documents which have been already photographed in said first run under a normal unjammed condition, photographing of the original documents in the reloaded run being initiated from the original documents which has been fed to said exposure position at the occurrence of said jamming based upon a signal from a counter which counts said original documents as said original documents are fed to said exposure position, said jamming being detected when a time interval between counting of successive documents is greater than a predetermined time.

11. A method of photographing a plurality of original documents wherein said original documents are reloaded on a rotary camera after jamming occurs in photographing operation run, in the order loaded in the run during which jamming occurred, and wherein the first original document at the occurrence of jamming in the preceding operation run its photographed again in the n ext operation run of reloading and photographing the original documents based upon a signal from a counter which counts said original documents as said original documents are fed to said exposure position, said jamming being detected when a time interval between counting of successive documents is greater than a predetermined time.

12. A method of photographing a plurality of original documents wherein said original documents are reloaded on a rotary camera when a lamp failure condition is detected in any photographing operation run, in the same order as loaded in the run during which said lamp failure condition was detected, said microfilm being moved to pass through an exposure position without photographing the original documents which have been already photographed in said first run under a normal unjammed condition, photographing of the original documents in the reloaded run being initiated from the original document which has been fed to said exposure position just at the occurrence said lamp failure condition based upon a signal from a counter which counts said original documents as they are fed to an exposure position, said lamp failure condition being detected when a quantity of light outputted by a lamp illuminating said original documents during exposure fall to a level which is below a predetermined level.

13. A method of photographing a plurality of original documents wherein said original documents are reloaded on a rotary camera when a lamp failure condition is detected in any photographing operation run, in the same order as loaded in the run during which said lamp-off condition was detected, and wherein the first original documents at the occurrence of said lamp failure condition in the preceding operation run is photographed again in the next operation run of reloading and photographing said original documents based upon a signal from a counter which counts said original documents as they are fed to an exposure position, said lamp failure condition being detected when a quantity of light outputted by a lamp illuminating said original documents during exposure fall to a level which is below a predetermined level.

* * * * *